United States Patent Office 2,921,082
Patented Jan. 12, 1960

2,921,082
NEW ORGANIC COMPOUND

Werner Richard Boehme, Somerville, N.J., assignor to Ethicon, Inc., a corporation of New Jersey No Drawing. Application October 28, 1958
Serial No. 769,986

1 Claim. (Cl. 260—347.8)

This invention relates to a new organic substance, namely 2-n-heptadecanoyl-2,5-dimethoxytetrahydrofuran.

The novel compound is prepared by converting hexadecyl bromide to the Grignard reagent and reacting the resulting compound with 2-carbomethoxy-2,5-dimethoxytetrahydrofuran. The resulting compound is useful in very low concentration as an immunizing agent against poison ivy. A single intramuscular or subcutaneous injection of from 5 to 50 mg. dissolved in sterile olive oil will provide sustained release effects without toxic manifestations.

The following example illustrates the method for preparing the novel compound.

Example I 20.2 parts by weight of hexadecyl bromide dissolved in 20 parts by volume of anhydrous ether is converted to the Grignard reagent with 1.85 parts by weight of magnesium turnings. The reaction is started with a drop of ethyl iodide and completed by refluxing for two hours. The Grignard reagent is added in portions at room temperature with stirring to a solution of 14.5 parts by weight of 2-carbomethoxy-2,5-dimethoxytetrahydrofuran [prepared according to the method of Clauson-Kaas and Limborg, Acta. Chem. Scand., 6, 551 (1952)] dissolved in 50 parts by volume of ether over a period of about two hours. The white suspension is stirred overnight, refluxed for one hour, cooled and decomposed with 10.5 parts by volume of saturated ammonium chloride. The clear supernatant is decanted, the solvent distilled and the residue fractionated. Some unreacted ester is recovered as a forerun, followed by a light yellow oil (B.P. 175–180° C./0.05 mm.) solidifying as a waxy solid melting at about 60° C.

The calculations for 2-n-heptadecanoyl-2,5-dimethoxytetrahydrofuran, $C_{23}H_{44}O_4$: 71.83% carbon, 11.53% hydrogen. Found: 72.01% carbon, 11.50% hydrogen.

What is claimed is:

The new compound 2-n-heptadecanoyl-2,5-dimethoxytetrahydrofuran.

References Cited in the file of this patent
UNITED STATES PATENTS

| | | |
|---|---|---|
| 2,748,142 | Clauson-Kaas et al. | May 29, 1956 |
| 2,801,252 | Clauson-Kaas et al. | July 30, 1957 |